United States Patent [19]

Vogel et al.

[11] 4,130,816
[45] Dec. 19, 1978

[54] CIRCUMFERENTIAL ACOUSTICAL DETECTOR

[75] Inventors: Charles B. Vogel; Gene T. Worrell, both of Houston, Tex.

[73] Assignee: Shell Oil Company, Houston, Tex.

[21] Appl. No.: 819,806

[22] Filed: Jul. 28, 1977

[51] Int. Cl.² ............................................. G01V 1/40
[52] U.S. Cl. ............................. 340/15.5 BH; 181/102;
    73/152; 166/214; 166/241; 340/15.5 SW
[58] Field of Search ..... 340/18 R, 15.5 BH, 15.5 TN,
    340/15.5 SW; 181/102, 104, 105; 175/40, 45,
    50, 230; 166/66, 100, 117.6, 118, 213, 214, 241,
    187, 120; 73/152

[56] References Cited

U.S. PATENT DOCUMENTS

| | | | |
|---|---|---|---|
| 2,876,413 | 3/1959 | Saurenman et al. | 166/250 |
| 2,991,835 | 7/1961 | Schwab | 166/214 |
| 3,363,719 | 1/1968 | Venghiattis | 340/15.5 SW |
| 3,426,865 | 2/1969 | Henry | 340/15.5 BH |
| 3,475,722 | 10/1969 | White | 340/15.5 SW |
| 3,564,914 | 2/1971 | Desai et al. | 181/102 |
| 3,648,515 | 3/1972 | Youmans | 73/152 |
| 3,662,172 | 5/1972 | Youmans | 73/152 |
| 3,691,518 | 9/1972 | Schuster | 340/15.5 TN |
| 3,775,739 | 11/1973 | Vogel | 340/15.5 SW |
| 3,794,976 | 2/1974 | Mickler | 340/15.5 BH |

*Primary Examiner*—Howard A. Birmiel

[57] ABSTRACT

An acoustical logging tool having a plurality of long, extendable, resilient arms, and means for remotely extending free ends of the arms into close proximity to the wall of a borehole. A cylindrical transducer is mounted on the free end of each arm, with some of the transducers being used as transmitters and the remainder as receivers. The signals from the receivers are separately recorded to provide a side-by-side comparison of the signals. The proper spacing of the transmitters and receivers will produce a complete circumferential acoustic log of the borehole that can be used to detect the presence of vertical fractures.

15 Claims, 10 Drawing Figures

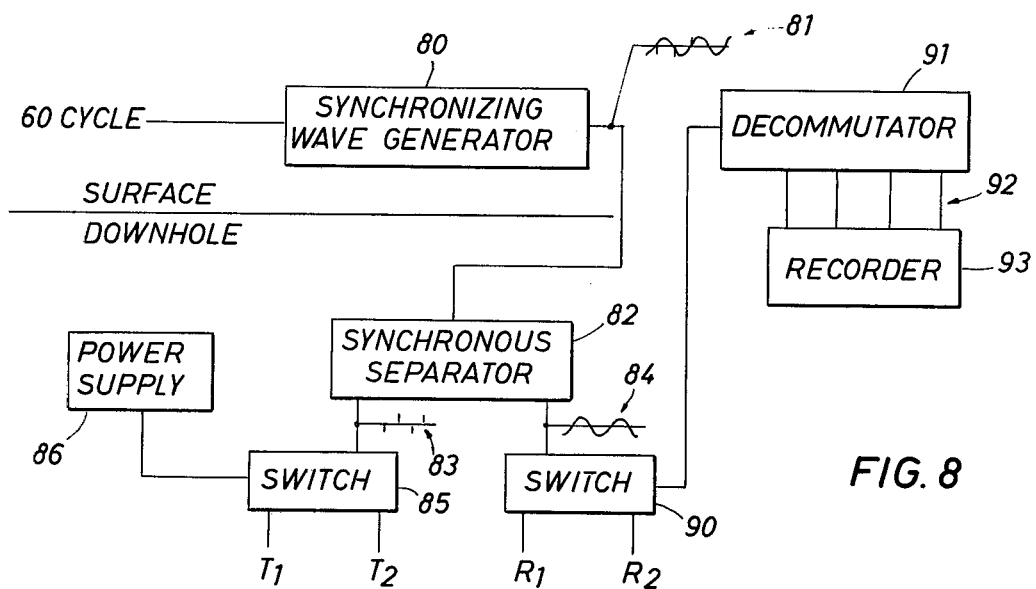
FIG. 8
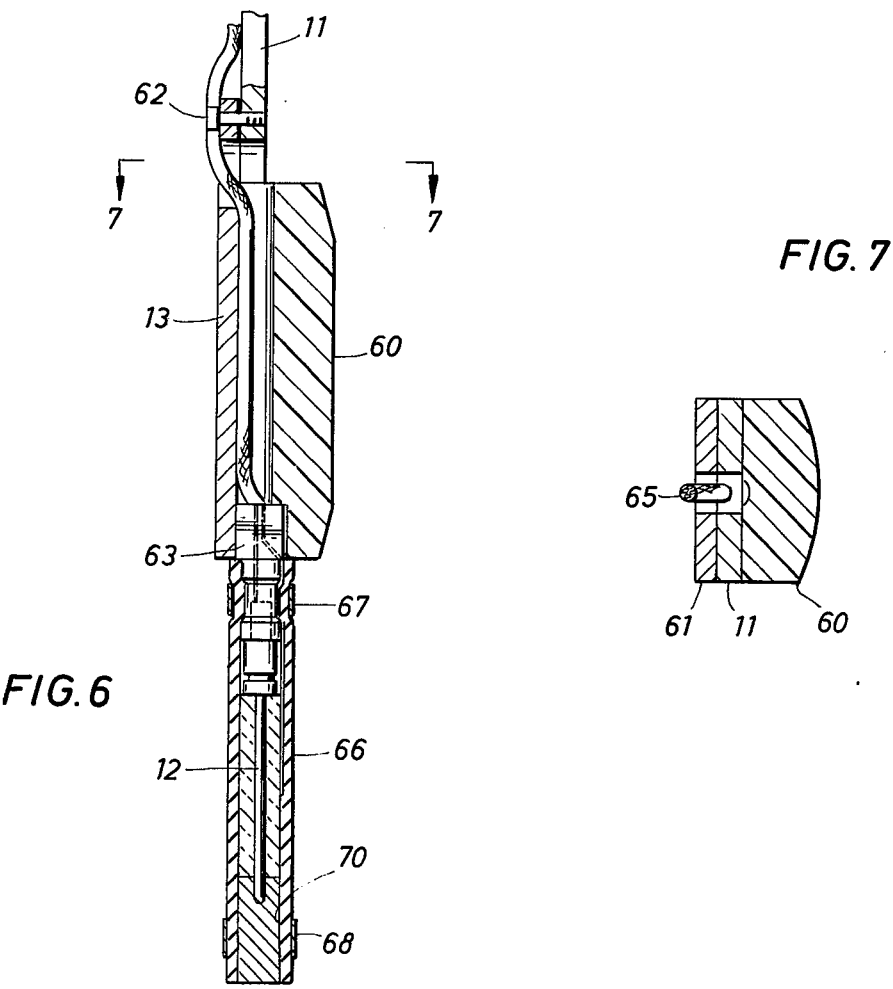
FIG. 7
FIG. 6

CIRCUMFERENTIAL ACOUSTICAL DETECTOR

BACKGROUND OF THE INVENTION

The present invention relates to acoustical logging instruments, and particularly, acoustical logging instruments designed to detect the presence of vertical fractures in formations surrounding boreholes. The detection of vertical fractures in formations surrounding the borehole is important in the petroleum industry since many formations produce from fractured reservoirs. In normal drilling operations, the drilling mud used in drilling the borehole will invade vertical fractures, and prevent the location of the fractured formations using normal or conventional logging tools.

In the past, attempts have been made to provide acoustical logging instruments which would produce acoustic waves that would travel circumferentially around the borehole to detectors where the acoustical waves were received. The signals produced by the received waves were separately reported. Normally, the logging instruments were constructed to detect both the compressional and shear waves traveling circumferentially around the borehole wall. Both compressional and shear waves were detected since compressional waves would pass through a fluid-filled fracture while shear waves would be absorbed in the fluid filling the fracture. Thus, if a compressional wave was present but no shear was present, it would be an indication that a vertical fracture was present in the formation.

The prior attempts to instrument the above conception have suffered from certain disadvantages. For example, one approach, described in U.S. Pat. No. 3,794,976, was used with omnidirectional transmitting transducers to produce acoustical waves which traveled through the formation. The received waves were then processed to separate the compressional and shear waves which could then be displayed. This approach was not entirely successful, possibly due to the fact that the transmitting transducer was located a considerable distance from the surface of the borehole wall. Another approach, as described in U.S. Pat. No. 3,775,739, utilized two sets of transmitting transducers. One of the transmitting transducers was oriented to produce substantially compressional waves in the formation while the other transducer was angled so as to produce substantially shear waves in the formation. This approach is a considerable improvement over the single omni-directional transducer in that the shear wave and compressional waves were separately produced and received. While this approach improved the results, it also included the additional complication of having two transmitting transducers and two separate receiving transducers in place of a single-transmitting and a single-receiving transducer.

BRIEF DESCRIPTION OF THE INVENTION

The present invention solves the above problems by providing a logging tool having plurality of greatly elongated, resilient arms; one end of the arm being firmly attached to the logging tool, and the other end being free. The free end of the arm may be extended so that it is in relatively close proximity to the wall of the borehole. At the free end of each arm there is attached, by means of a transducer mount, a transducer which is held closely to the borehole wall. The transducer is covered by a soft, resilient material, such as soft plastic or rubber. A relatively soft wear pad is attached to the transducer mount which is, in turn, attached to the arm. The wear pad rubs the borehole wall during logging operation and maintains the distance from wall to transducer small and constant. By providing a means for extending the arms after the tool has been lowered into the borehole, the possibility of damage to the transducers, is greatly reduced. Further, after the interval of interest has been logged, the arms may be retracted and the tool can be removed from the borehole without the possibility of damage to the transducers.

The cylindrical transducer on each of the arms is oriented with its major axis parallel to the axis of the tool in the borehole. The length of each transducer is made relatively long compared to the wave length of the acoustical energy to produce a source substantially directional as to azimuth. This use of a highly-directional sound source insures a maximum amount of acoustical energy will be concentrated in a very narrow circumferential band in the borehole. The concentration of acoustical energy in a narrow band around the borehole improves the performance of the tool, and the cylindrical form of the transducers simplifies the generation and detection of both compressed and shear waves.

BRIEF DESCRIPTION OF THE DRAWINGS

The invention will be more easily understood from the following detailed description when taken in conjunction with the attached drawings in which:

FIG. 6 is an enlarged vertical section showing the transducer mounting attached to the end of each of the arms;

FIG. 7 is a cross-section taken along line 77 of FIG. 6; and

FIG. 8 is a block diagram of a circuit for use with the logger.

PREFERRED EMBODIMENT

Figure 1:
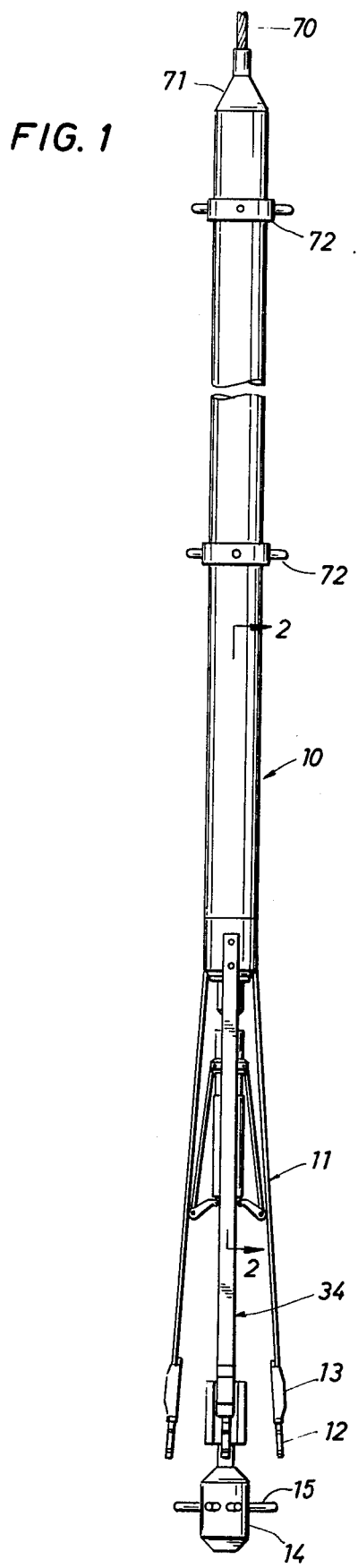
FIG. 1 is a elevation view of the logger with the arms in the extended position.
Figure 4:
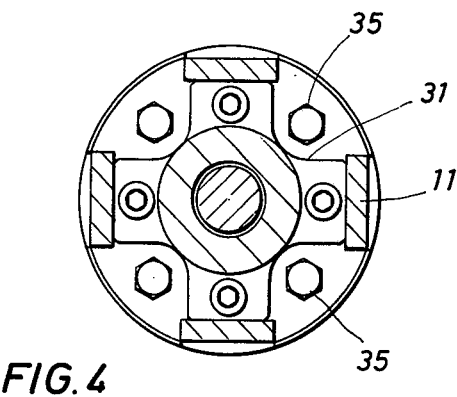
FIG. 4 is a section taken along line 44 of FIG. 2.

Referring to FIG. 1, there is shown the logging tool with the arms in an extended or logging position. As explained above, the arms are retracted as the tool is lowered into the borehole, and then extended to start a logging run. After the interval of interest has been logged, the arms are again retracted and the tool withdrawn from the borehole. The tool comprises an elongated case, or housing 10, having an extension 34 at the lower end. The extension serves to support both the mechanism for extending and retracting the arms and a stabilizer-protector 14 at the lower end. The stabilizer 14 is provided with a plurality of radially-extending flexible fingers 15 which serve to stabilize the tool and center it as it is lowered into the borehole. The radial fingers 15 may be suitable, flexible plastic, or solid rubber fingers. The tool is provided with four elongated arm members 11 which have suitable transducer mounts 13 and transducers 12 disposed at their lower ends. It should be noted that the arms 11 are relatively long compared to the diameter of the borehole and the diameter of the tool. For example, it has been found that a tool having a case diameter of 4½ inches and arms 36 inches long successfully logged boreholes up to a diameter of 10 inches. The use of the long arms results in very small changes in the vertical displacements of the transducers as the arms move in the response to changes in borehole diameter during logging operations.

Figure 2A:
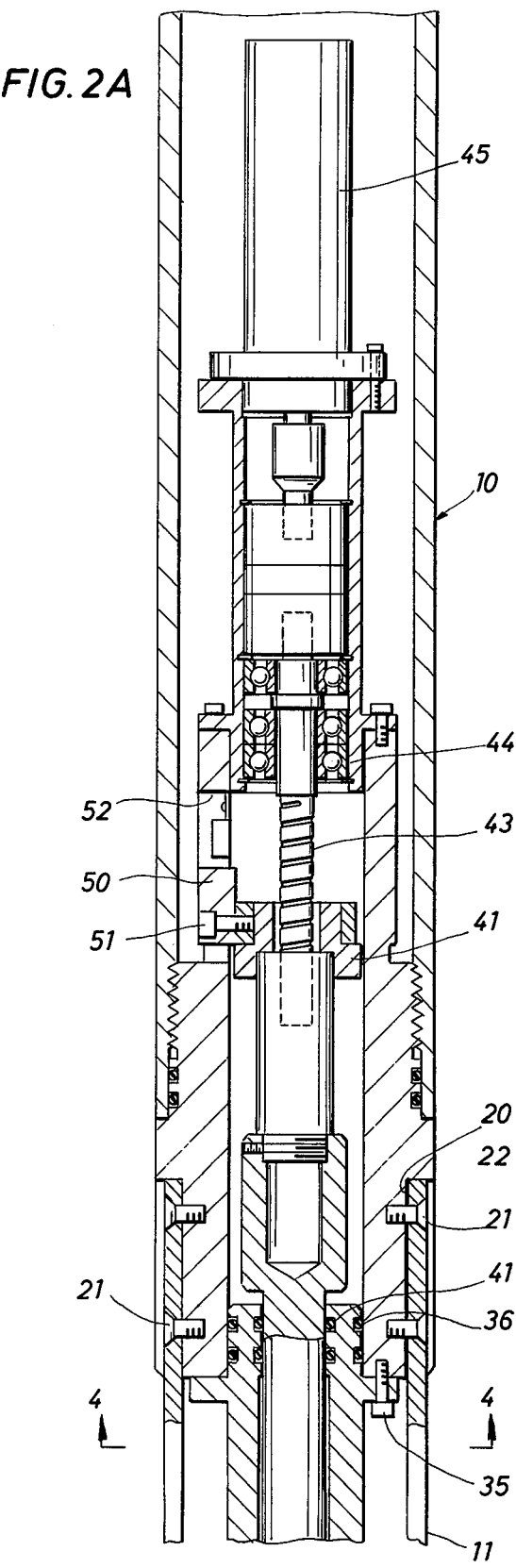
FIGS. 2A and 2B are partial vertical sections of the instrument showing FIG. 1.
Figure 2B:
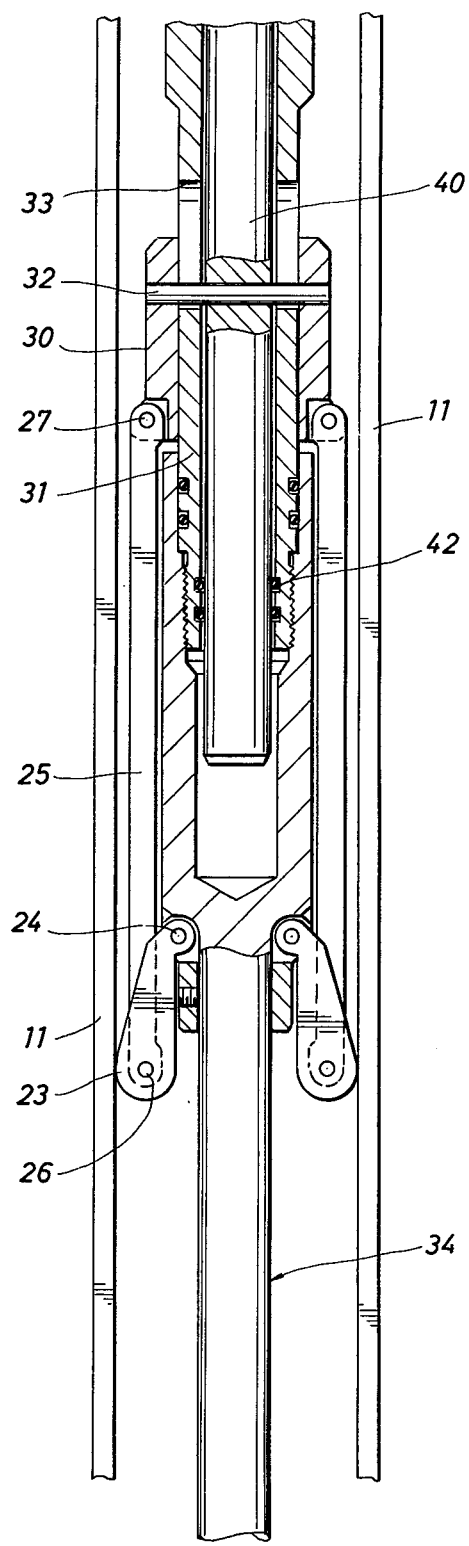

Referring now to FIGS. 2A and 2B, there is shown a detailed construction of the logging tool with the arms in the retracted position. The case, or housing 10, is comprised of an elongated, thin-walled, tubular member which is closed at its lower end by threaded end cap 20. The end cap 20 is provided with suitable cut-out, or flat sections 22, on which the upper ends of the elongated arms 11 are secured. The arms may be secured to the flat recesses by means of flathead cap screws 21. The arms are constructed of suitable spring material, and formed so that their natural bias will tend to retract them; and thus, it is only necessary to forcefully extend them and they will retract on their own when the means used for extending them is also retracted.

Figure 5:
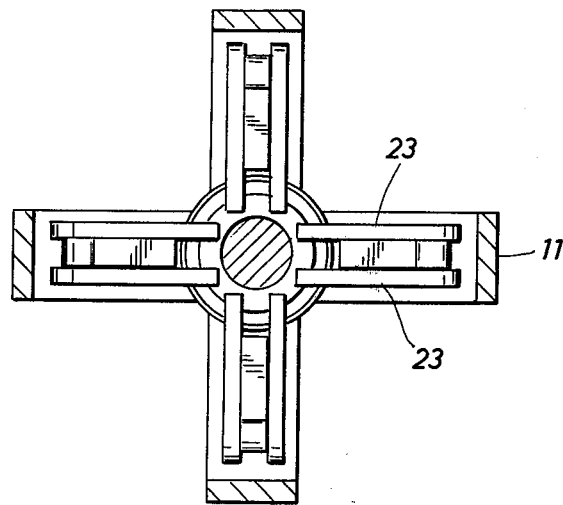
FIG. 5 is a section taken along line 55 of FIG. 3.

The arms are extended by deflection arms 23, which are pivotly mounted by means of pins 24 on a lower extension 34 of the housing. Upper end of the lower extension 34 threads onto an upper extension 31 which, in turn, is secured to end cap 20, at its upper end by means of a series of cap screws 35. Suitable o-rings 36 and 41 are provided for sealing the connections between the upper housing extention 31 and the means used for actuating the deflection arms 23, as explained below. The deflection arms are operated, or rotated, by means of operating members 25 which are pivotly connected at their lower ends to the deflection arms by pins 26. The upper ends of the operating arms 25 are pivotly connected to a tubular member 30 which slides, or reciprocates, along the outer surface of the upper extension 31. The operating arms are pivotly connected to the tubular member 30 by pins 27. As seen in FIG. 5, each of the elongated arms 11 is extended by two deflection arms 23, with the operating member 25 being disposed between the two spaced deflection arms.

The tubular member 30 is coupled to a reciprocating actuating member 40 by means of a pin 32 with the pin 32 having a limited axial movement in the upper extension 31. The axial movement is controlled by the length of the slot 33 cut in the side wall of the extension member 31. The reciprocating member 40 is coupled at its upper end to a traveling nut 41, as shown in FIG. 2A that is reciprocated by means of a ball screw 43, which is driven by an electric motor 45. The ball screw 43 is held in an axial position by means of the thrust bearing 44. The traveling nut 41 is provided with a radial extension on its left side 51, which slides in a slot 52 cut in the upper portion of the end cap 20 with the combination of the extension and slot, limiting the travel of the nut as well as preventing its rotation.

From the above description, it can be seen that the arms 11 are normally retracted by the spring action of the arms. In order to extend the arms, the electric motor 45 rotates the ball screw 43 in a direction to move the traveling nut 41 upward, as shown in FIG. 2A. The upward movement of the traveling nut will reciprocate, or move, the rod member 40 upwardly. The upward movement of member 40 moves the tubular member 30 up, and the operating arms 25 pivot the deflection arms 23 outwardly. The outward movement of the deflection arms forces the arms 11 outwardly with the degree of extension of the arms 11 being controlled by the movement of the traveling nut 41. The movement of the traveling nut can be controlled by counting or otherwise monitoring the revolutions of the drive motor 45.

Figure 3A:
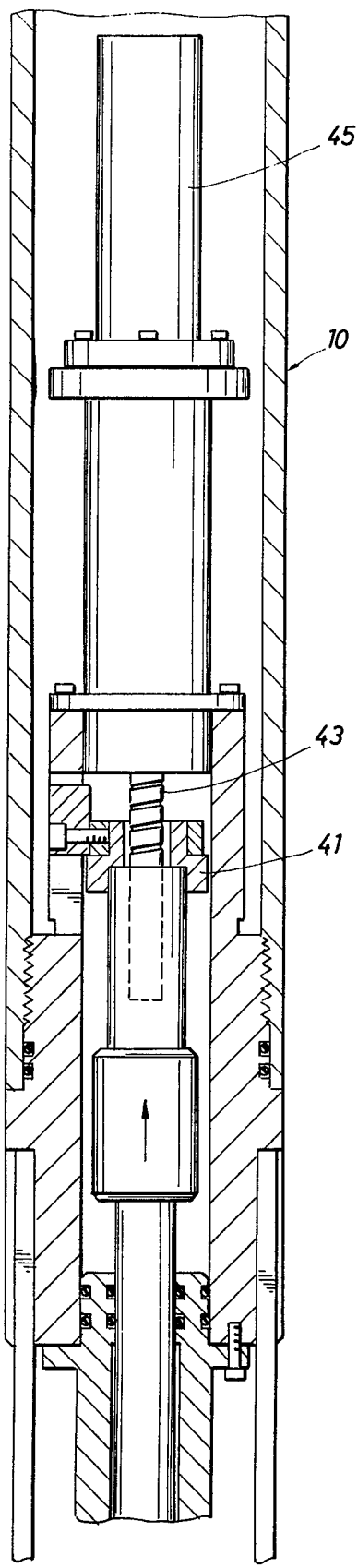
FIGS. 3A and 3B are additional partial vertical sections of the arms in the extended position.
Figure 3B:
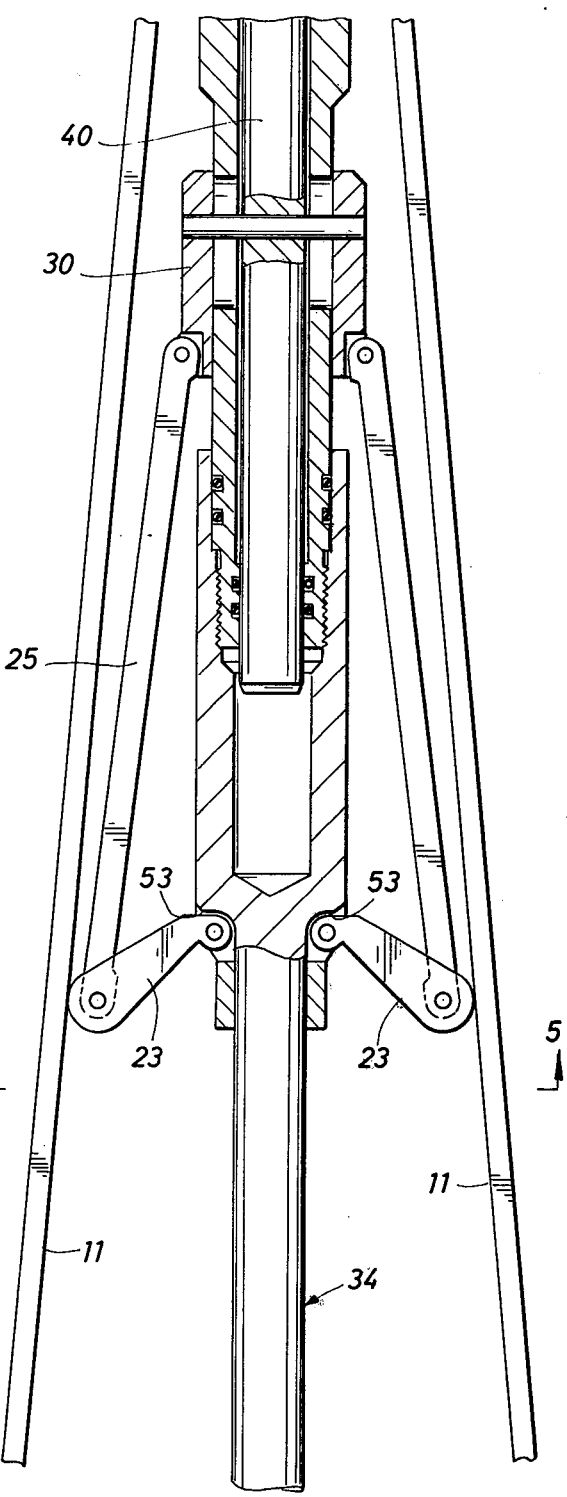

The arms 11 are shown in an extended position in FIGS. 3A and 3B with the maximum extension of the arms being controlled by the design of the deflection arms. When the deflection arms arrive at the position shown in FIG. 3B, the upper cam surface 53 contacts the shoulder formed on the extension member 34, and prevents further movement of the deflection arms. Of course, as explained above, the arms can be extended to any position intermediate between the position shown in FIG. 3B and a fully retracted position.

FIGS. 6 and 7 illustrate the detailed construction of the transducer mounting, transducer, and wear pads that are attached to the free end of each arm. Transducer mount 13 is secured to the free end of the arms by means of cap screws 62. Also, a plastic wear pad 60 is secured to the transducer mount 13 to provide protection for the transducer which is mounted below the mount. When the arms 11 are extended, the wear pads 60 contact the borehole wall and thus, protect the transducers while maintaining a constant distance between the transducers and the borehole wall. The upper end of the transducer 12 is secured to a mandrel 63, which is attached to the lower end of the transducer mount 13. The lead 65 from the transducer is threaded through a passageway in the wear pad 60 and up the inner side of the arm 11. The transducer is protected by means of a plastic tube 66, which is secured to the upper end of the transducer by means of a clamp 67, and has its lower end enclosed by a plug 70 which is clamped in place by clamp 68. The interior of the plastic tube is preferably filled with air.

As explained above, cylindrical transducers are used which have a length that exceeds one wave length of the frequency of the power supply used for energizing transducers. For example, excellent results have been obtained using a transmit wave train having a frequency of 100 KHZ, and a transducer having a diameter of $\frac{1}{2}$ inch and 1 inch length.

The use of cylindrical transducers is important in the present invention since they radiate acoustic energy over 360°. As is well-known, shear waves are produced in a medium when a compressional wave strikes an interface between the medium and a second medium at the proper angle. Thus, some energy from the transducer will strike the borehole wall at the proper angle to produce shear waves in the formation surrounding the borehole. It is also important that the transducers be placed as close to the wall of the borehole as possible, preferably within 1/16 inch of the wall. This can be accomplished in the present instrument by proper design of the wear pads 60 in relation to the mounting of the transducers. Further, the transducers can contact the wall of the borehole since they are protected by the plastic tube 66.

While the transducers radiate energy over 360°, no means are required for absorbing the energy radiated into the borehole fluid in the present invention. Fractures always occur in hard formations in which acoustic waves have a high velocity. Thus, shear waves produced in the formation will have a high amplitude while compressional waves will have a low amplitude. Likewise, the shear wave amplitude will be much greater than the water wave. Thus, no means are required for absorbing the water wave or isolating the shear wave from the compressional wave in the formation.

The tool is raised and lowered in the borehole using a conventional logging cable 70 that is attached to the top of the housing by a cable head 71. A series of centralizers 72 are positioned on the housing 10 to centralize the housing in the borehole and prevent the housing from contacting the borehole.

In operating the above-described tool, the tool is inserted into the borehole with the arms in a fully retracted position. The tool is then lowered until it reaches the lower depth of the interval to be logged, and the arms are extended by energizing motor 45. By use of suitable servo-mechanisms, or counting the revolutions of the motor, one can accurately position the arms until the plastic wear pads 60, shown in FIG. 6, contact the borehole wall. After the arms are extended, the logging tool is raised through the borehole while energizing the transmitters and recording the received signals. After the interval of interest has been logged, the arms are again retracted and the logging tool removed from the borehole. The lowering of the tool with the arms retracted permits a rapid lowering speed while the retracting of the arms after the interval of interest has been logged permits a rapid withdrawal of the tool from the borehole.

A block diagram of the electronic circuits used is shown in FIG. 8. At the surface, a synchronizing wave generator 80 produces a signal having a wave form 81. The wave form 81 comprises the basic 60-cycle power plus a negative and positive pulse on each positive and negative cycle. The signal from the generator 80 is transmitted downhole to a synchronous separator 82 which separates the negative and positive pulses from the 60-cycle power. The synchronous separator produces two output signals having wave forms 83 and 84. The negative and positive pulses of waveform 83 are used to operate a switch 85 that alternately couples the power supply 86 to the two transmitting transducers $T_1$ and $T_2$. The 60-cycle signal having waveform 84 is supplied to switch 90 that alternately couples the receiving transducers $R_1$ and $R_2$ to logging cable 70. At the surface, the decommutator 91 separates the receiver signals into four separate signals that are individually recorded on the recorder 93. In operation the switch 85 alternately connects the transmitting transducers $T_1$ and $T_2$ to the power supply 86. Thus, the transducer $T_1$ produces acoustic impulses in synchronism with the negative pulse and the transducer $T_2$ produces acoustic impulses in synchronism with the positive pulses. In a similar manner, the switch 90 connects the receiver $R_1$ to the logging cable 70 during positive cycles of the 60-cycle power, and the receiver $R_2$ during negative cycles. Thus, during positive cycles, $R_1$ will receive acoustic waves first from $T_1$ and then $T_2$. Similarly, during negative cycles, $R_2$ will receive acoustic waves first from $T_1$, and then $T_2$. At the surface, the receiver signals can be separated and recorded in the desired order.

Obviously, the speed of energizing the transducers in combination with the speed at which the tool is moved through the borehole will determine the degree of coverage of the borehole wall. Again, excellent results have been achieved using the logging speed of 30 feet per minute in combination with 240 transmitter firings per second. This would produce 50 complete coverages of the borehole per foot of depth.

What is claimed is:

1. An acoustical logging tool for obtaining a circumferential acoustic log of a borehole, said logging tool comprising:
   an elongated housing;
   a plurality of elongated arms, said arms comprising flat spring members having one end secured to said housing and having the free ends extending along the axis of said housing;
   actuating means mounted in said housing, and disposed to extend the free end of said arms, said arms being retracted by the biasing force of said flat spring members;
   a plurality of transducers, one of said transducers being mounted on the free end of each of said arms;
   circuit means coupled to some of said transducers to energize said transducers to produce acoustical impulses;
   additional circuit means coupled to the remainder of said transducers to receive said acoustical impulses and transmit related signals to the surface; and,
   recording means, said additional circuit means being coupled to said recording means to separately record said related signal.

2. The acoustical logging tool of claim 1 in which said circuit means energizes said some of said transducers individually in a predetermined sequence.

3. The acoustical logging tool of claim 2 in which the remainder of said transducers are individually coupled to a recording means in a predetermined sequence.

4. The acoustical logging tool of claim 1 wherein four arms are used, said arms being equally spaced around the circumference of said housing.

5. The acoustical logging tool of claim 4 wherein two transmitting transducers are mounted on the free ends of two of said arms, said two arms being positioned diametrically opposite each other, and two receiving transducers being mounted on the free ends of the remaining two arms.

6. The acoustical logging tool of claim 1, and in addition, said arms are retracted by the biasing force of said spring members; a plurality of deflection arms, said deflection arms being pivotably mounted on said housing at a point between the ends of said spring members; and actuating means operably coupled to said deflection arms to rotate said deflection arms about their pivoted ends, the other end of said deflection arms contacting said spring members to force the free end of said spring members outward as said deflection arms are rotated.

7. The acoustical logging tool of claim 6 in which said actuating means comprises a lead screw; a traveling nut, said lead screw engaging said traveling nut; a plurality of actuating rods, said actuating rods being pivotably coupled at one end to said traveling nut and at the other end to the said other end of said deflection arms; motor means for driving said lead screw to move said traveling nut along the axis of said housing and rotate said deflection arms, thereby extending said spring members.

8. An acoustical logging tool for obtaining a circumferential acoustical log of a borehole, said logging tool comprising:
   an elongated housing, the top of said housing including means for securing said housing to a logging cable;
   an elongated extension, said extension being secured to the bottom of said housing and extending along the axis of said housing;
   a plurality of elongated resilient arms, said arms having a length at least three times the diameter of the borehole to be logged, one end of each arm, in addition, being securely fastened to said housing adjacent the bottom thereof with the free ends of said arms extending along the axis of said extension;

a plurality of transducers, one of said transducers being mounted adjacent the free end of each of said arms;

a plurality of wear pads, one of said wear pads being mounted adjacent the free end of each arm, said wear pads being disposed to contact the borehole wall and prevent said transducers from contacting the borehole wall; and actuating means disposed to extend the free ends of said arms outwardly, said arms being retracted when said actuating means is reversed by the resiliency of said arms.

9. The logging tool of claim 8 wherein said transducers are cylindrical transducers, said transducers being mounted with their longitudinal axis aligned with the axis of said extension.

10. The logging tool of claim 9 wherein said transducers have an overall length at least equal to one wave length of the frequency of the power supply used to excite said transducers.

11. The logging tool of claim 8 wherein said actuating means comprises a lead screw and traveling nut; a plurality of deflecting arms, one deflecting arm being disposed in an operable position adjacent each arm; said deflecting arms being coupled to said traveling nut whereby said traveling nut moves said deflecting arms to extend said arms and withdraws said deflecting arms to allow the resiliency of said arms to retract the arms.

12. The logging tool of claim 11 wherein each of said deflecting arms have one end pivotly mounted on said extension and the other end bearing against one of said arms.

13. The logging tool of claim 12 wherein said traveling nut is coupled to said deflecting arms by operating arms that are pivotly coupled at one end to the traveling nut and pivotly coupled at the other end to said deflecting arms.

14. The logging tool of claim 8 wherein there are four elongated arms.

15. The logging tool of claim 13 wherein said deflecting arms are formed by a pair of deflecting arms with said operating arms disposed between said pair of deflecting arms.

* * * * *